United States Patent
Achlioptas et al.

(10) Patent No.: US 8,244,240 B2
(45) Date of Patent: Aug. 14, 2012

(54) QUERIES AS DATA FOR REVISING AND EXTENDING A SENSOR-BASED LOCATION SERVICE

(75) Inventors: Dimitris Achlioptas, Santa Cruz, CA (US); John C. Krumm, Redmond, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/427,778

(22) Filed: Jun. 29, 2006

(65) Prior Publication Data

US 2008/0004037 A1    Jan. 3, 2008

(51) Int. Cl.
*H04W 4/00*    (2009.01)
*H04W 24/00*    (2009.01)
*H04B 1/04*    (2006.01)

(52) U.S. Cl. .................. 455/433; 455/414.2; 455/456.2

(58) Field of Classification Search .................. 455/433, 455/414.2, 456.2; 701/207, 213
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,104,978 A * | 8/2000 | Harrison et al. | 701/207 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |

(Continued)

FOREIGN PATENT DOCUMENTS

WO    9800787    1/1998

OTHER PUBLICATIONS

Andy Harter, et al., A Distributed Location System for the Active Office, IEEE Network, 1994, pp. 62-70.

(Continued)

*Primary Examiner* — Ariel Balaoing
(74) *Attorney, Agent, or Firm* — Lee & Hayes, PLLC

(57) ABSTRACT

The claimed subject matter provides systems and/or methods that facilitate automatically maintaining a database of base stations. A location component can obtain a query that includes a listing of detected base stations. Additionally, the location component can identify whether the detected base stations are included in a base station database. Further, the location component can generate an estimated location related to the query. Moreover, a database update component can modify the base station database based at least in part upon the query.

19 Claims, 15 Drawing Sheets

U.S. PATENT DOCUMENTS

| | | | |
|---|---|---|---|
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0094821 A1* | 7/2002 | Kennedy, Jr. | 455/456 |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |
| 2007/0077945 A1* | 4/2007 | Sheynblat | 455/456.5 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

QUERIES AS DATA FOR REVISING AND EXTENDING A SENSOR-BASED LOCATION SERVICE

BACKGROUND

Technological advances in computer hardware, software and networking have lead to efficient, cost effective computing systems (e.g., desktop computers, laptops, handhelds, cellular telephones, servers, . . . ) that can communicate with each other from essentially anywhere in the world in order to exchange information. These systems continue to evolve into more reliable, robust and user-friendly systems. Further, these systems can enable locating people, equipment, and other tangibles. Such systems can be useful for providing directions (e.g., driving directions, . . . ) and/or maps, controlling access to restricted areas, monitoring inventory, and so on. A number of location sensing technologies are commonly available. Examples of location systems can include Global Positioning System (GPS), Active Badges, Active Bats, MotionStar, VHF Omni-directional ranging, Cricket, MSR radar, Easy Living, Smart Floor, and the like.

Another type of location sensing technology can be radio-based. Radio-based location systems typically utilize a database of radio base station locations. A mobile radio can detect some of these base stations, and a triangulation routine can be invoked to estimate a location of the mobile radio as a function of known locations of the detected base stations. Disparate types of radio base stations have been employed in such systems including, for instance, Wi-Fi (e.g., 802.11), cellular, FM radio, AM radio, TV station, etc. However, the database of base stations can be incomplete and/or become out of date as base stations are moved, removed, and/or added. This is especially acute for Wi-Fi, since these base stations are easy to buy, install, and/or reinstall in a new location. A conventional technique utilized to attempt updating of the database of base stations can be wardriving, which can involve searching for Wi-Fi wireless networks by moving vehicle. For example, a wardriver can employ a Wi-Fi equipped computer (e.g., laptop, personal digital assistant (PDA), . . . ) to detect the networks (e.g., wireless access points, base stations, . . . ) and a GPS can measure and log locations of the network as a car or truck traverses within a geographic region. However, such a technique can be an expensive, difficult, and time consuming manner by which to maintain the base station related database.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that provide passive techniques for maintaining a database related to base stations for a radio-based location service. As opposed to conventional techniques, a system can be provided that automatically refreshes content of the database. Queries submitted by users of a triangulation service can be leveraged to effectuate updating the database. These queries can include lists of detected base stations that can be provided to a central database server which responds with location estimates. In particular, the methods hinge on mathematical techniques that allow global spatial inferences to be generated from a set of local observations.

In accordance with various aspects of the claimed subject matter, a mobile radio can wirelessly communicate with any number of base stations. The mobile radio can detect base stations within proximity and provide a listing of such base stations as a query for a location service. The query can be provided to a location component that can identify whether the detected base stations are included in a database and/or generate an estimated location to provide to the mobile radio in response to the query. Additionally, a database update component can enable modifying a database of base station related information in response to data included in the query. The data from the query can evince addition, removal, relocation, and the like of base station(s).

Pursuant to one or more aspects of the claimed subject matter, a database can be updated by incorporating data related to a previously unknown base station. For example, the previously unknown base station may not be included in the database, yet identifying characteristics can be incorporated with a received location related query. By way of illustration, an entry can be provided to the database for the previously unknown base station. As an approximation, a triangulated location estimate obtained in response to the query can be entered into the database for the previously unknown base station. Further, more sophisticated reasoning concerning the position of the base station can be applied. Thus, for instance, techniques such as message passing and/or belief propagation can be carried out to determine the location of the base station; however, the claimed subject matter is not so limited.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
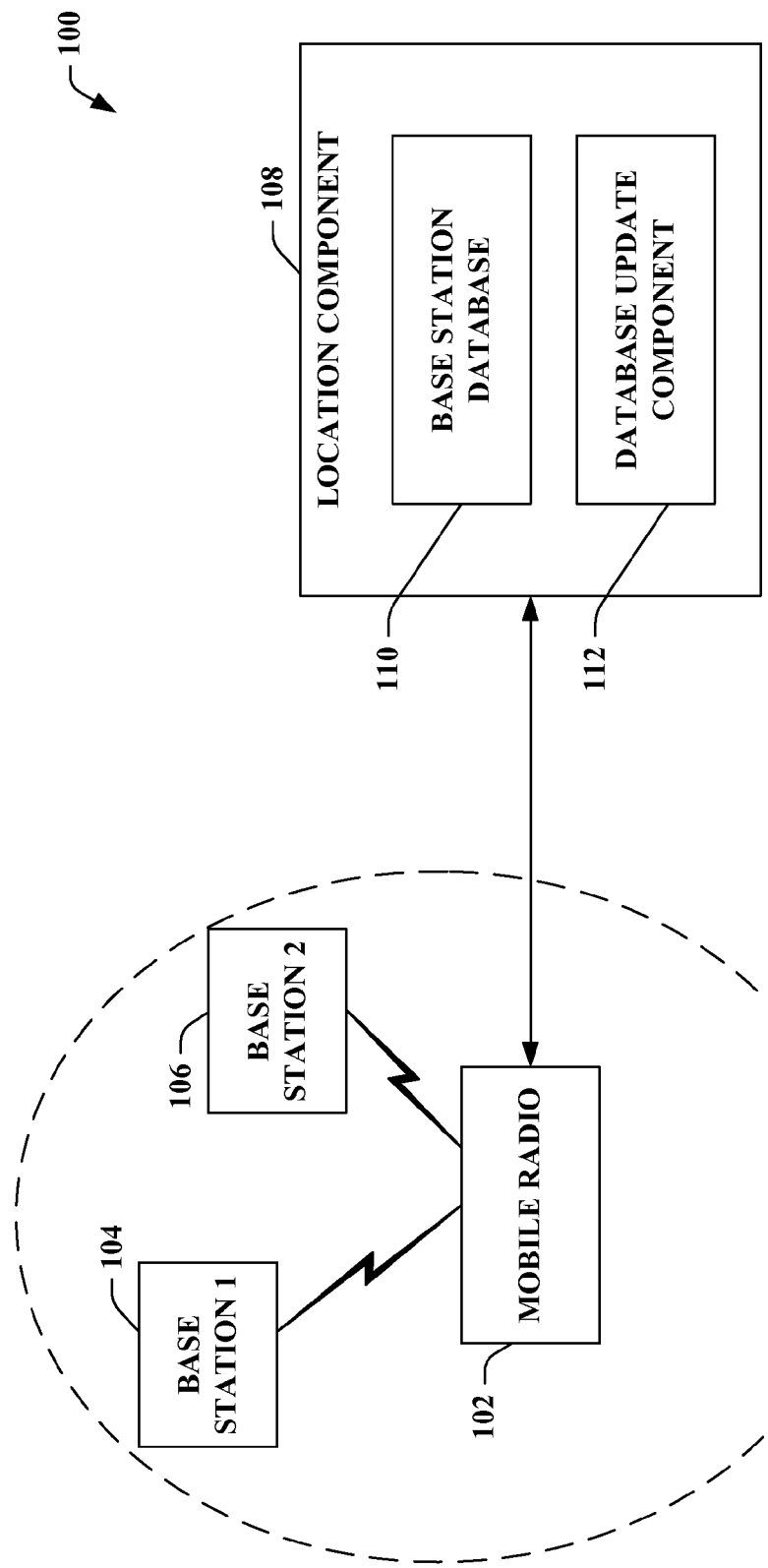
FIG. 1 illustrates a block diagram of an exemplary system that facilitates automatically maintaining a database of base stations.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates automatically maintaining a database of base stations. The system 100 can include a mobile radio 102 that can wirelessly communicate with any number of base stations (e.g., base station 1 104, base station 2 106, . . . ). Additionally, the system 100 can include a location component 108 that can identify a location of the mobile radio 102 based upon detected base stations 104-106. The location component 108 can further include a base station database 110 that can comprise data (e.g., location related information, base station identifying data, . . . ) associated with known base stations and a database update component 112 that can modify the contents of the base station database 110 (e.g., to account for base stations that have been added, removed, moved, modified, . . . ).

The mobile radio 102 can be, for instance, a cellular telephone, a cordless telephone, a personal computer, a laptop computer, a handheld computer, a personal digital assistant (PDA), or any device having wireless connection capability. Additionally, the mobile radio 102 can be associated with a sensing zone of any size and/or shape (depicted as a dotted line). It is to be appreciated that any number of base stations can be within the sensing zone corresponding to the mobile radio 102 and any number of base stations can be positioned outside of the sensing zone at any other locations. Further, a base station (e.g., the base station 1 104, the base station 2 106, . . . ) can be positioned within any number of disparate sensing zones related to different mobile radios (e.g., in addition to or instead of the mobile radio 102). Moreover, the base stations 104-106 (and/or any disparate base station(s)) can be Wi-Fi access points (e.g., 802.11), cellular towers, AM radio stations, FM radio stations, TV stations, any other type of electromagnetic transmitting station, and/or a combination thereof It is to be appreciated that the base stations 104-106 can be stationary and/or mobile.

The mobile radio 102 can detect any base stations 104-106 positioned within a corresponding sensing zone. As illustrated, the base station 1 104 and the base station 2 106 can be identified by the mobile radio 102. Further, the mobile radio 102 can provide a query to the location component 108 to enable determining a position associated with the mobile radio 102. The query can provide a list of the detected base stations 104-106. Additionally or alternatively, the query can include data related to strength of signals obtained from the base stations 104-106. The location component 108 can utilize a triangulation technique to estimate the location of the mobile radio 102 as a function of the location(s) of the detected base stations 104-106 that are known (e.g., included in the base station database 110). Further, the base station database 110 can be maintained by utilizing the queries submitted by the mobile radio 102 (and/or any disparate mobile radios) associated with obtaining the estimated location.

The location component 108 can be implemented upon a central server that can communicate with any number of mobile radios similar to mobile radio 102. Thus, the base station database 110 can be maintained in a network-accessible database and the mobile radio 102 can communicate with the base station database 110 to obtain base station coordinates (e.g., related to detected base stations 104-106). The content of the base station database 110 can depend upon the radio system and/or a type of electronic endpoint utilized for location purposes. The base station database 110 can include information utilized to determine a position of the mobile radio 102. For example, the base station database 110 can include beacon or electronic endpoint information that can uniquely identify a radio beacon or an electronic endpoint. Further, the base station database 110 can include latitude, longitude, and/or elevation information related to each of the known base stations 104-106. Pursuant to an illustration, the location related information included in the base station database 110 can be obtained with a measurement (e.g., utilizing GPS). Additionally or alternatively, the location related information can be based upon an observation of a set of base stations (e.g., the base stations 104-106, . . . ) detected by a mobile radio (e.g., the mobile radio 102, . . . ).

According to an example, the mobile radio 102 can identify four base stations (not shown). Pursuant to this example, the mobile radio 102 can provide a query to the location component 108 including a listing of the identified base stations. The location component 108 can reference the contents of the base station database 110 and identify that three of the four base stations are included in the base station database 110, while one of the base stations is not included, for instance. Thus, the location related information associated with the three known base stations from the base station database 110 can be employed to determine the location of the mobile radio 102 (e.g., by employing triangulation, . . . ). Further, according to an illustration, the database update component 112 can add the fourth base station to the base station database 110 and provide a corresponding, approximated location at the determined position of the mobile radio 102; however, the claimed subject matter is not limited to the database update component 112 modifying the base station database 110 in accordance with the aforementioned example. For instance, it is contemplated that the database update component 112 can employ message passing to enable altering the contents of the base station database 110. Additionally, such updating by the database update component 112 can be effectuated while the location component 108 provides responses to mobile radio queries, at a disparate time dedicated to updating the base station database 110, a combination thereof, etc. Also, it is to be appreciated that the location component 108 is not limited to utilization in connection with a Wi-Fi scenario; the methods can be leveraged with one or more sets of sensors, including radio-centric sensors operating at different bands.

A number of sources of data can be utilized to enhance the base station database 110. For instance, base station location data may be derived from war driving data and/or obtained from a third party. According to an illustration, black boxes can be deployed on automobiles (e.g., garbage trucks, delivery trucks, and the like) to obtain war driving data, which can be converted to base station location data. Additionally or alternatively, logs of user queries may be employed by the database update component 112. By way of example, a user (e.g., associated with the mobile radio 102) may effectuate an operation (e.g., a "Locate Me" feature) to determine her corresponding location (e.g., by sending a query to the location component 108); thus, an IP address, time stamp, a list of base station MAC addresses, and/or a list of signal strengths related to the base station(s) can be logged each time such an operation is invoked.

Figure 2:
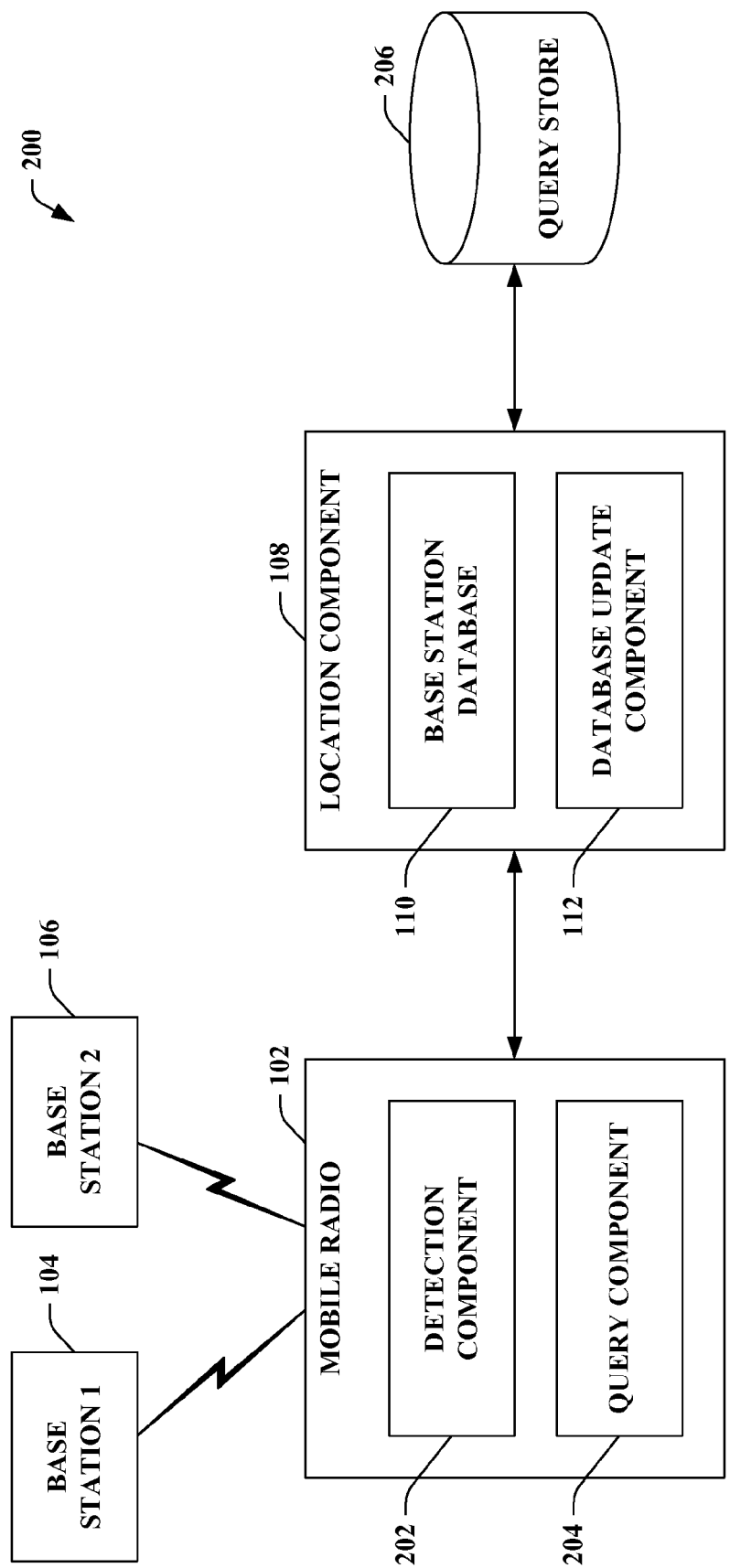
FIG. 2 illustrates a block diagram of an exemplary system that performs location related queries that can be utilized to revise and/or extend a radio-based location service.

Turning to FIG. 2, illustrated is a system 200 that performs location related queries that can be utilized to revise and/or extend a radio-based location service. The system 200 includes the mobile radio 102 that can communicate with the base stations 104-106. Additionally, the system 200 can comprise the location component 108 that can determine a position of the mobile radio 102 based at least in part upon data retained in the base station database 110. Further, the location component 108 can include the database update component 112 to enable adding, removing, and/or altering content within the base station database 110. Moreover, the mobile radio 102 can comprise a detection component 202 and/or a query component 204. Also, queries issued by the query component 204 can be received by the location component 108 and stored in a query store 206.

The detection component 202 can detect base stations (e.g., the base stations 104-106, . . . ) in a local vicinity of the mobile radio 102 based upon received or obtained signals. A search for or gathering of base station signals (or any disparate manner of identifying the base stations 104-106) can be continuous, periodic, or on-demand and can be initiated by a user action, autonomously by the system 200, and/or at the request of a remote service. For example, the detection component 202 can scan the communication environment for base stations 104-106. The result of the scan can be a set of base station identifiers and can include reception characteristics. For example, a scan for Wi-Fi access points can result in a MAC address for each detected access point (e.g., the base stations 104-106, . . . ) and can include the signal strength of each detected access point. A scan for cell towers can yield receiving or obtaining cell tower identifications and the corresponding signal strength of each detected cell tower. Reception characteristics can be obtained or received in addition to, or in lieu of, signal strength. An example of an alternative reception characteristic can be a detection probability associated with the base station (e.g., the base station 1 104, the base station 2 106, . . . ), computed by scanning for base stations multiple times.

Additionally or alternatively, the detection component 202 can compute a reception characteristic, which can be a measure of the detection probability of the base station (e.g., the base station 1 104, the base station 2 106, . . . ). This detection probability can be measured by performing repeated scans for base stations and computing the ratio of the number of times a particular base station (e.g., the base station 1 104, the base station 2 106, . . . ) was detected to the total number of scans. It is to be understood that reception characteristics can be signal strength and detection probability and each can be employed by the location component 108.

The information obtained by the detection component 202 can be transmitted to the location component 108 by the query component 204. The query component 204 can communicate information to and receive information from the location component 108. For instance, the information can be transmitted to and/or from the query component 204 periodically, continuously, on request, etc.

Moreover, the queries provided by the query component 204 and obtained by the location component 108 can be stored in the query store 206. The query store 206 can include queries from any number of disparate mobile radios in addition to or instead of mobile radio 102. The query store 206 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The query store 206 of the subject systems and methods is intended to comprise, without being limited to, these and any other suitable types of memory. In addition, it is to be appreciated that the query store 206 can be a server, a database, a hard drive, and the like.

Figure 3:
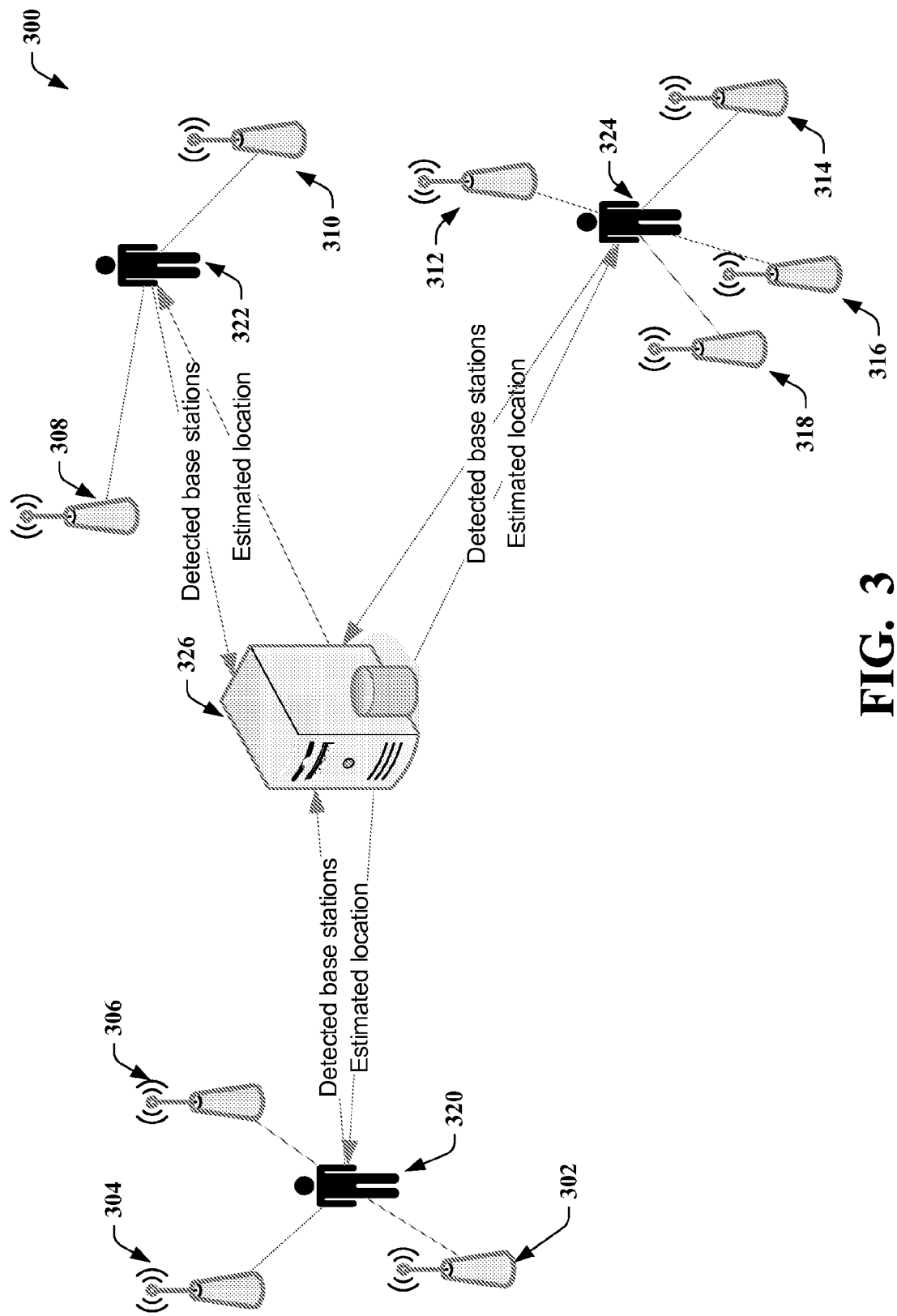
FIG. 3 illustrates a block diagram of an exemplary system that aggregates queries from a number of users to maintain a database of base stations.

With reference to FIG. 3, illustrated is a system 300 that aggregates queries from a number of users to maintain a database of base stations. The system 300 as illustrated includes nine base stations 302-318, three mobile radios 320-324 employed by disparate users, and a central database server 326; however, the claimed subject matter is not so limited. The system 300 provides an alterative manner by which to maintain the database of base stations that can be stored upon the central database server 326. In contrast, conventional techniques can update the database by utilizing GPS to locate the base stations 302-318; however, these typical techniques can be expensive and can require user action. Meanwhile, the system 300 can refresh the database in a manner that can be passive from a point of view of a user.

Pursuant to an example, the mobile radios 320-324 can each identify respective base stations 302-318 within close proximity (e.g., by obtaining signals from the base stations 302-318). Thus, the mobile radio 320 can detect base stations 302-306, the mobile radio 322 can detect base stations 308-310, and the mobile radio 324 can detect base stations 314-318. The mobile radios 320-324 can provide queries to determine their respective locations; thus, the mobile radios 320-324 can transmit data associated with the detected base stations (e.g., the mobile radio 320 can send data pertaining to base stations 302-306, the mobile radio 322 can transfer data related to base stations 308-310, and the mobile radio 324 can provide data associated with base stations 314-318) to the central database server 326. The central database server 326 can respond to the lists provided by each of the users with corresponding location estimates. With conventional systems, a server would normally not retain any record of the location queries after providing responses. However, the central database server 326 can store queries and provide reasoning related to updating the database of base station locations based upon the queries.

Figure 4:
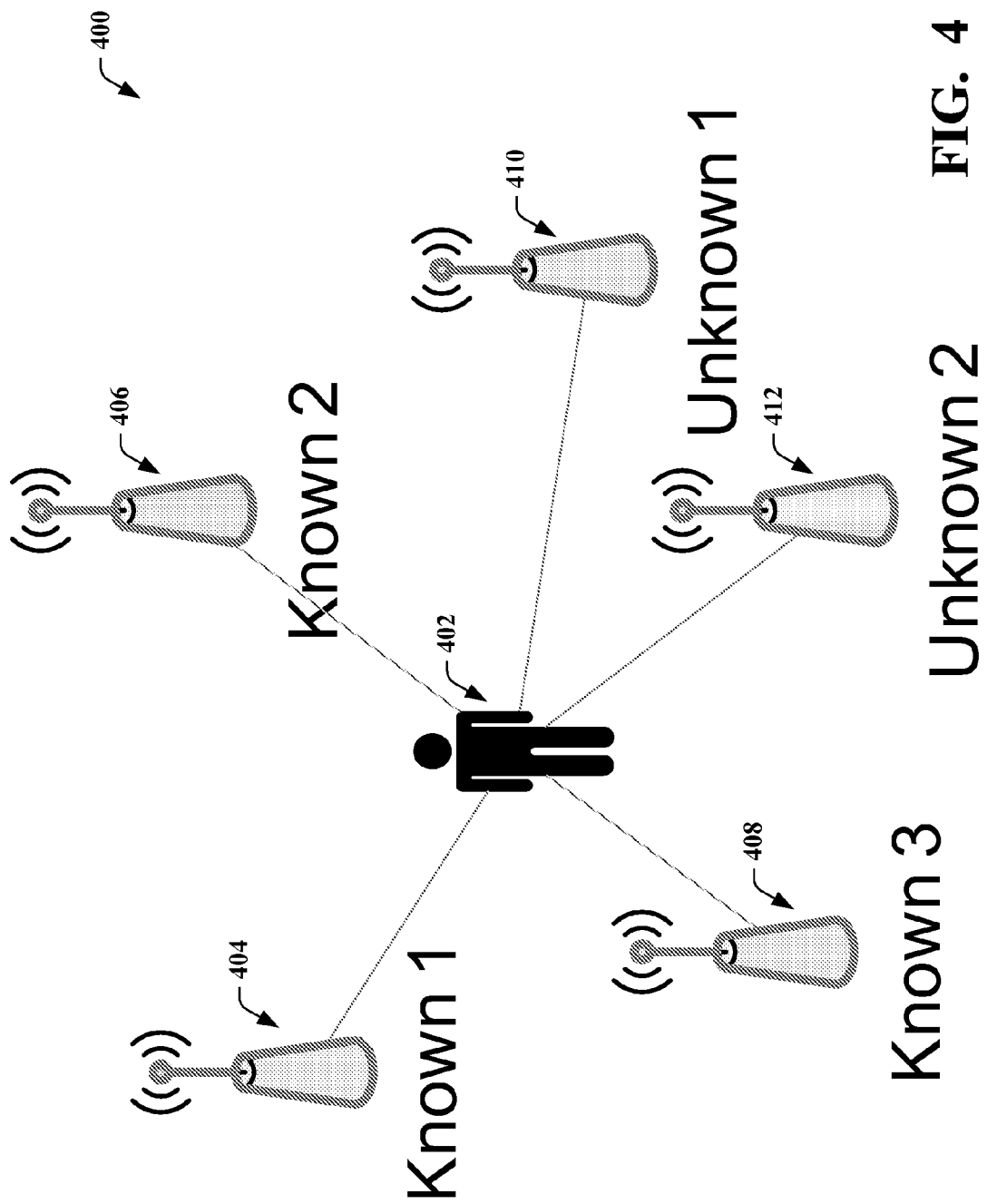
FIG. 4 illustrates an exemplary system that generates a location query that can include data associated with known and unknown base stations.

Turning to FIG. 4, illustrated is an exemplary system 400 that generates a location query that can include data associated with known and unknown base stations. A user employing a mobile device 402 can effectuate detecting base stations within a sensing zone associated with the mobile device 402. According to the depicted example, three base stations 404-408 that are known (e.g., included in a database of base station locations, . . . ) and two base stations 410-412 that are unknown can be identified.

The system 400 can utilize the three known base stations 404-408 to triangulate the location of the mobile radio 402. Additionally, the system 400 can employ the triangulated location as part of an estimate for the locations of the two unknown base stations 410-412. Pursuant to a further illustration, if an unknown base station (e.g., the unknown base station 410, the unknown base station 412, . . . ) is detected by multiple mobile radios, then the resulting queries can be stored and utilized to estimate the location associated with the unknown base station.

Figure 5:
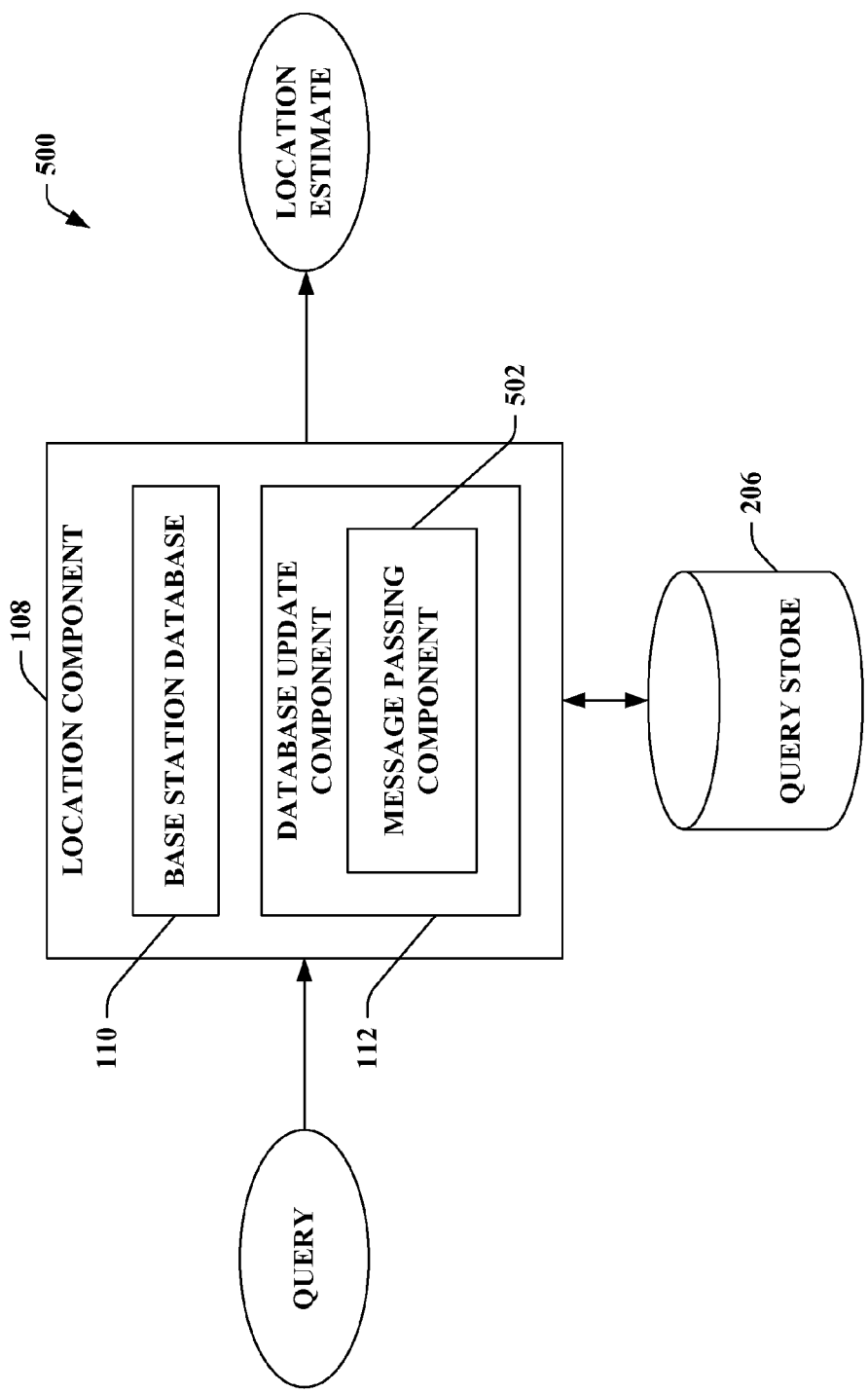
FIG. 5 illustrates a block diagram of an exemplary system that employs sophisticated reasoning in connection with updating a database of base station locations.

Now referring to FIG. 5, illustrated is a system 500 that employs sophisticated reasoning in connection with updating a database of base station locations. The system 500 includes the location component 108 that receives a query (e.g., from the mobile radio 102 of FIG. 1, . . . ) that can include a list of detected base stations. The query can be retained in the query store 206 after the location component 108 provides a location estimate corresponding to the query. Further, the location component 108 can determine whether the detected base stations are included within the base station database 110. The detected base stations that are known can be employed by the location component 108 to generate the location estimate in response to the query. The location component 108 can also include the database update component 112, which can further comprise a message passing component 502. The message passing component 502 can process accumulated queries from the query store 206 utilizing a message-passing algorithm that employs variables representing a state of the system and observations representing measurements.

The message passing component 502 can enable making global inferences based upon local information. For example, the message passing component 502 can make inferences for base station(s) in downtown Redmond, Wash. that can be essentially independent of inferences made for downtown Bellevue, Wash., yet information can flow in the entire urban area between them (and thus, reach the two downtowns). To effectuate performing global spatial inferences from interconnected local spatial inferences, the message passing component 502 can exploit the decay of correlation as a function of spatial distance while extracting maximal information from the observations (e.g. since an ad hoc separation of space need not be enforced into regions).

Figure 6:
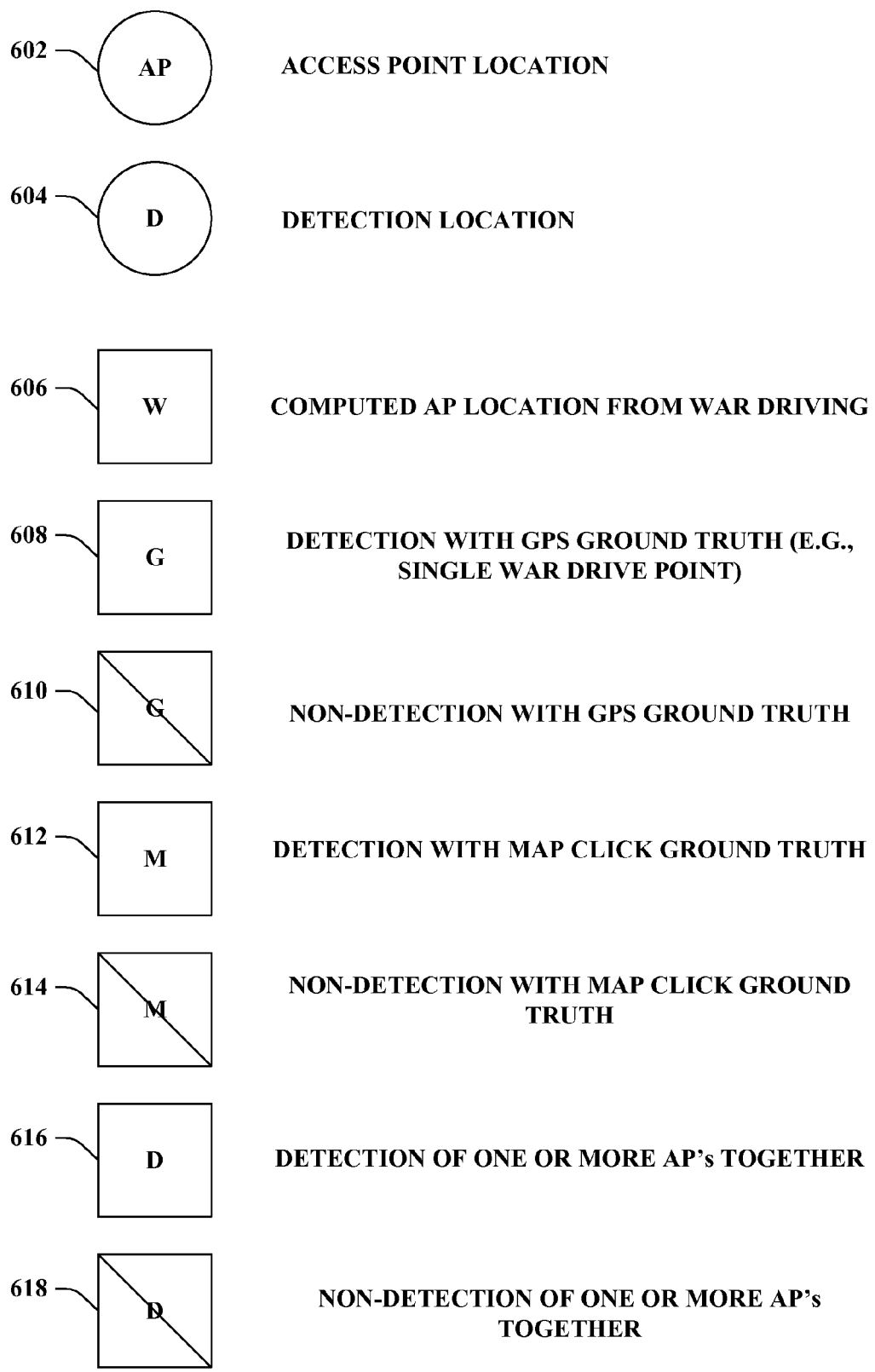
FIG. 6 illustrates an example graphical representation of a set of nodes associated with belief propagation.

With reference to FIG. 6, illustrated is an example graphical representation of a set of nodes associated with belief propagation. According to an illustration, a way to maintain and/or update the database of access points can be with a belief propagation algorithm. This algorithm represents relevant information as a combination of discrete nodes in a connected graph. FIG. 6 shows a possible set of nodes, divided into two types: variables and observations. Variable nodes represent a variable to be estimated, such as the location of a base station. Observation nodes represent data gathered through observation. Node 602, labeled "AP", is a variable node representing the location of a base station. Node 604, labeled "D", is a variable node representing the location of a radio-receiving device when such a device detected one or more base stations. This could represent the location of a user when invoking the triangulation service.

Node 606, labeled "W", is an observation node representing the computed location of a base station node. The computed location can be the result of war driving. Node 608, labeled "G", is a GPS observation of a set of base stations. It represents a radio receiver with an independent location-measuring device, such as a GPS. Node 612, labeled "M", is a similar type of observation that can result from a user indicating his or her own location by clicking on a displayed map. Node 616, labeled "D", is an observation node representing the detection of one or more base stations, but with no associated, independent location measurement.

Node 608 ("G"), node 612 ("M"), and node 616 ("D"), which can be observation nodes, each can have a complementary observation node representing the base stations that were not detected (e.g., node 610, node 614, and node 618). Nodes 610, 614, and 618 can represent the set of base stations that are known to exist but that were not detected when a detection scan was performed.

Figure 7:
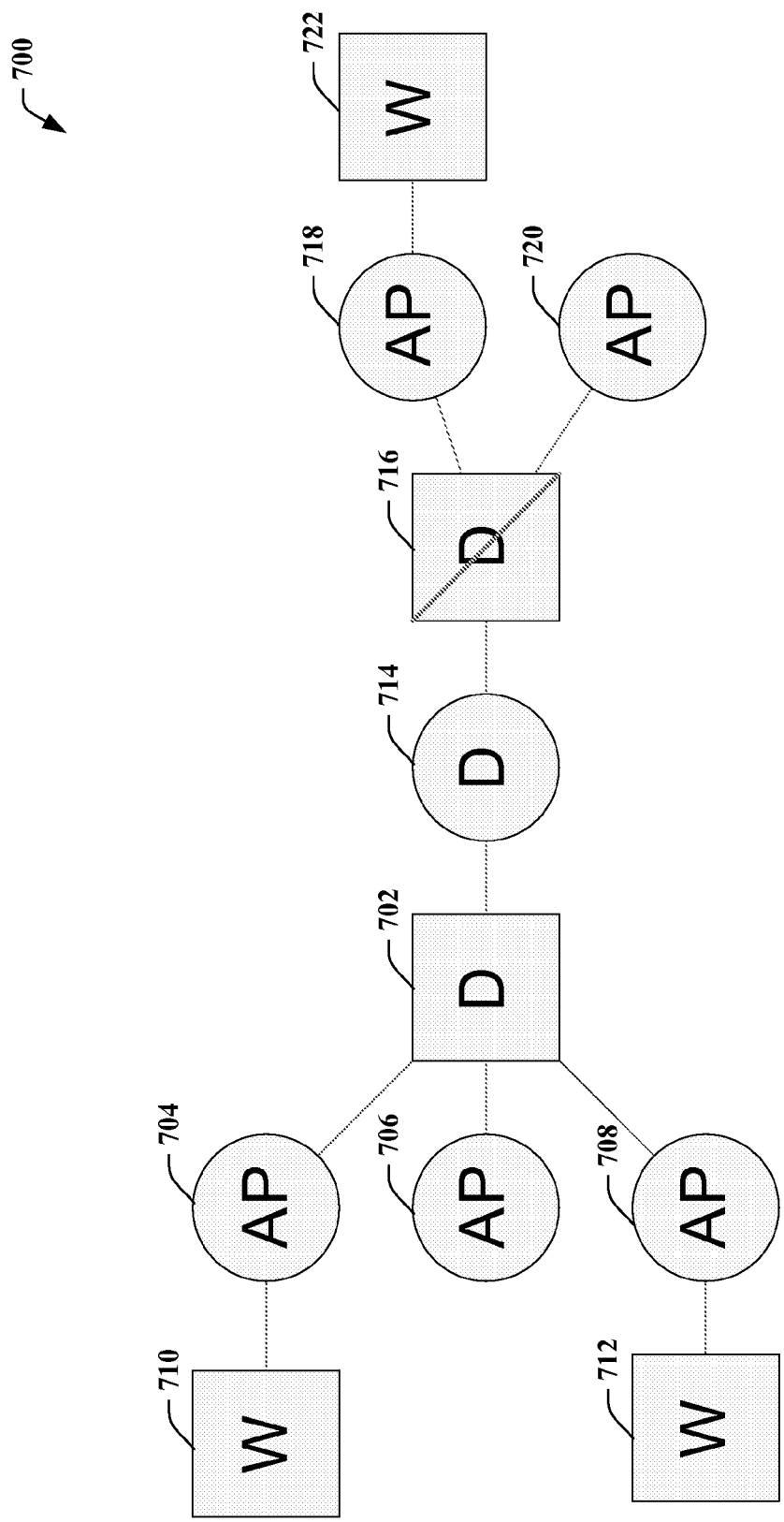
FIG. 7 illustrates an example of the graph resulting from a single detection event.

FIG. 7 illustrates an example of the graph 700 resulting from a single detection event. The detection observation 702 represents the detection of three base stations (e.g., associated with node 704, node 706, and node 708). Two of these base stations have associated computed locations (e.g., observation node 710 and observation node 712). The detection variable 714 represents the location of the radio receiver. As shown, it can be further connected to a non-detection observation 716, which in turn represents that two base stations were not detected (e.g., associated with node 718 and node 720). Further, one of the non-detected base stations (e.g., related to node 718) can be associated with a computed location (e.g., observation node 722).

Figure 8:
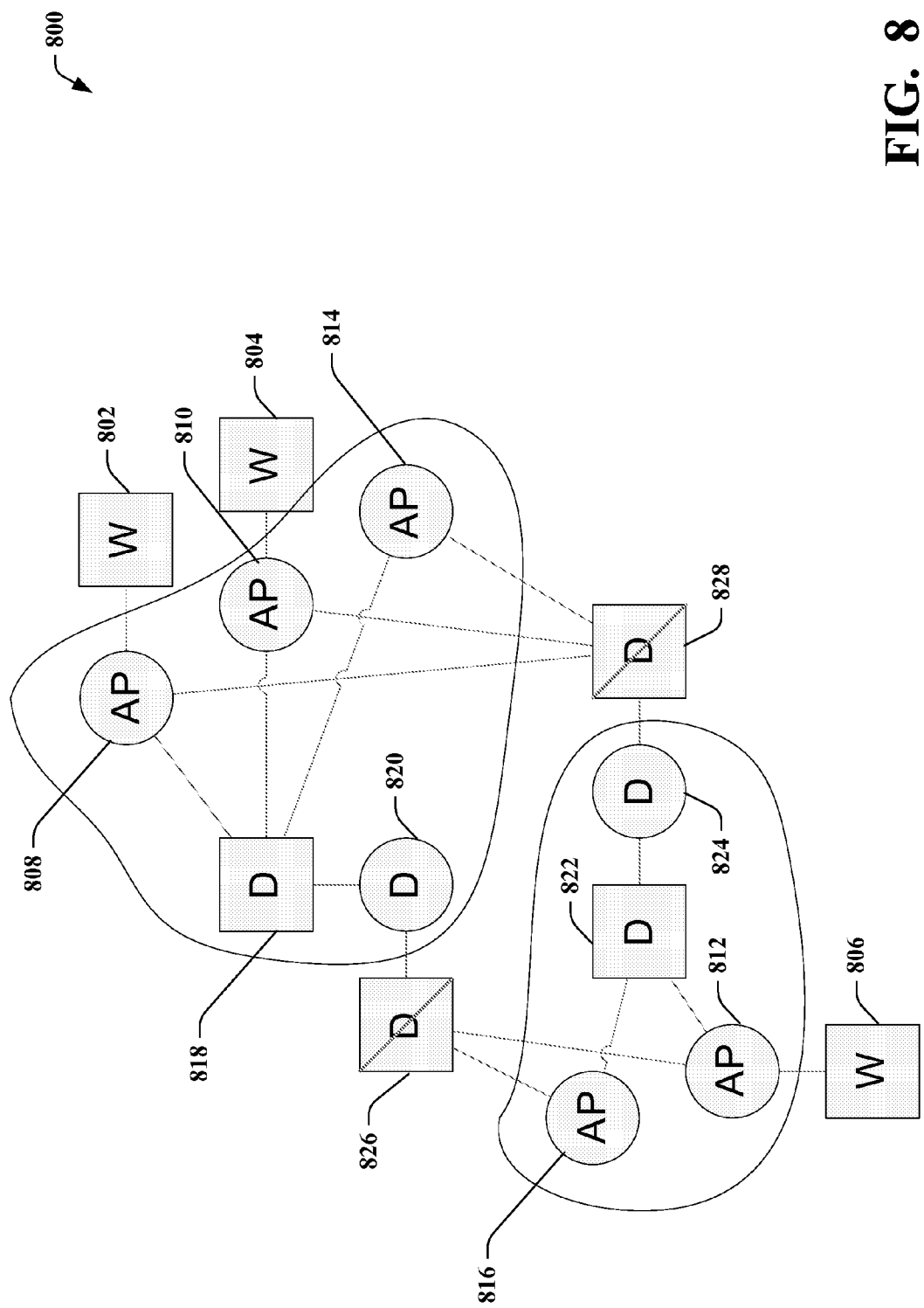
FIG. 8 illustrates an example diagram that graphically represents variable and observation nodes utilized in connection with belief propagation.

Turning to FIG. 8, illustrated is an example diagram 800 that graphically represents variable and observation nodes utilized in connection with belief propagation. In this example, there are three observation nodes, 802, 804, and 806, labeled "W", representing measured locations of base stations represented by variable nodes 808, 810, and 812. The edges connecting these nodes represent their associations. Furthermore, there are two base station variables, 814 and 816, whose locations have not been measured in any independent way. Detection observation 818 represents a scan that detected base stations 808, 810, and 814 simultaneously from a single location. This observation 818 is associated with detection variable 820, which represents the location from which the scan was taken. Similarly, detection observation 822 represents the simultaneous detection of base stations 812 and 816. The location of this detection is represented by variable node 824. The two non-detection observations, 826 and 828, represent which base stations were not detected by the detection observation 818 and 822, respectively. From this, it can be seen how to build up a graph of variables and observations representing the data available for updating the database. Note that variable nodes can connect only to observation nodes, and observation nodes can connect only to variable nodes.

The updating algorithm can be effectuated by way of enabling the nodes to compose messages and passing them along the connecting edges. In general, a message can represent a distribution of possible locations.

Figure 9:
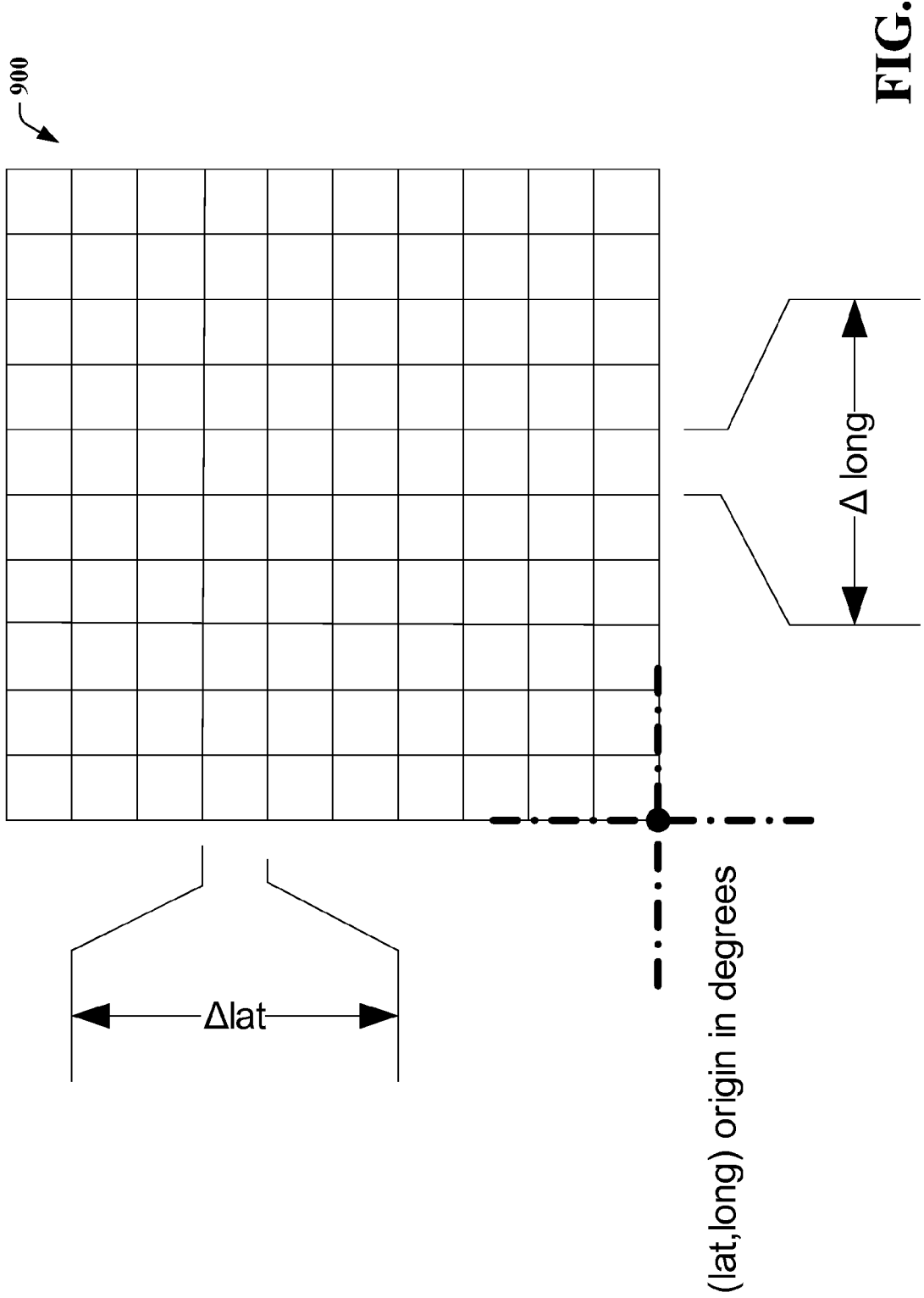
FIG. 9 illustrates an example grid that can represent messages passed between connected neighboring nodes.

Turning to FIG. 9, illustrated is an example grid 900 that can represent messages passed between connected neighboring nodes. Nodes can pass messages to connected neighbors concerning the location of the variables. These messages can be aggregated, and the aggregated messages in the variable nodes can give the inferred distribution of the location corresponding to the variable.

In general, the messages can be represented by a grid in (latitude, longitude). The value at each grid point can represent a metric related to the value of a variable. Each message can have its own grid whose dimensions and grid spacing can be different from that of other messages. For instance, as shown in FIG. 9, the grid can be rectangular.

At different latitudes, Along can translate to different over-the-ground distances. If the grid is too large, then different parts of the grid can have different ground resolutions. Thus, a grid utilized in connection with the claimed subject matter can represent a small part of the earth in that each one can represent the uncertainty of the location of an AP or a user. Even when grids from multiple APs and a user are aggregated, they can still represent a small patch of earth.

Further, the size and spacing of grids can be automatic. This procedure can be a compromise between fidelity and size. For example, each grid can be N×N, and then an origin and grid spacing can be computed to faithfully represent the metric related to the value of variables.

Figure 10:
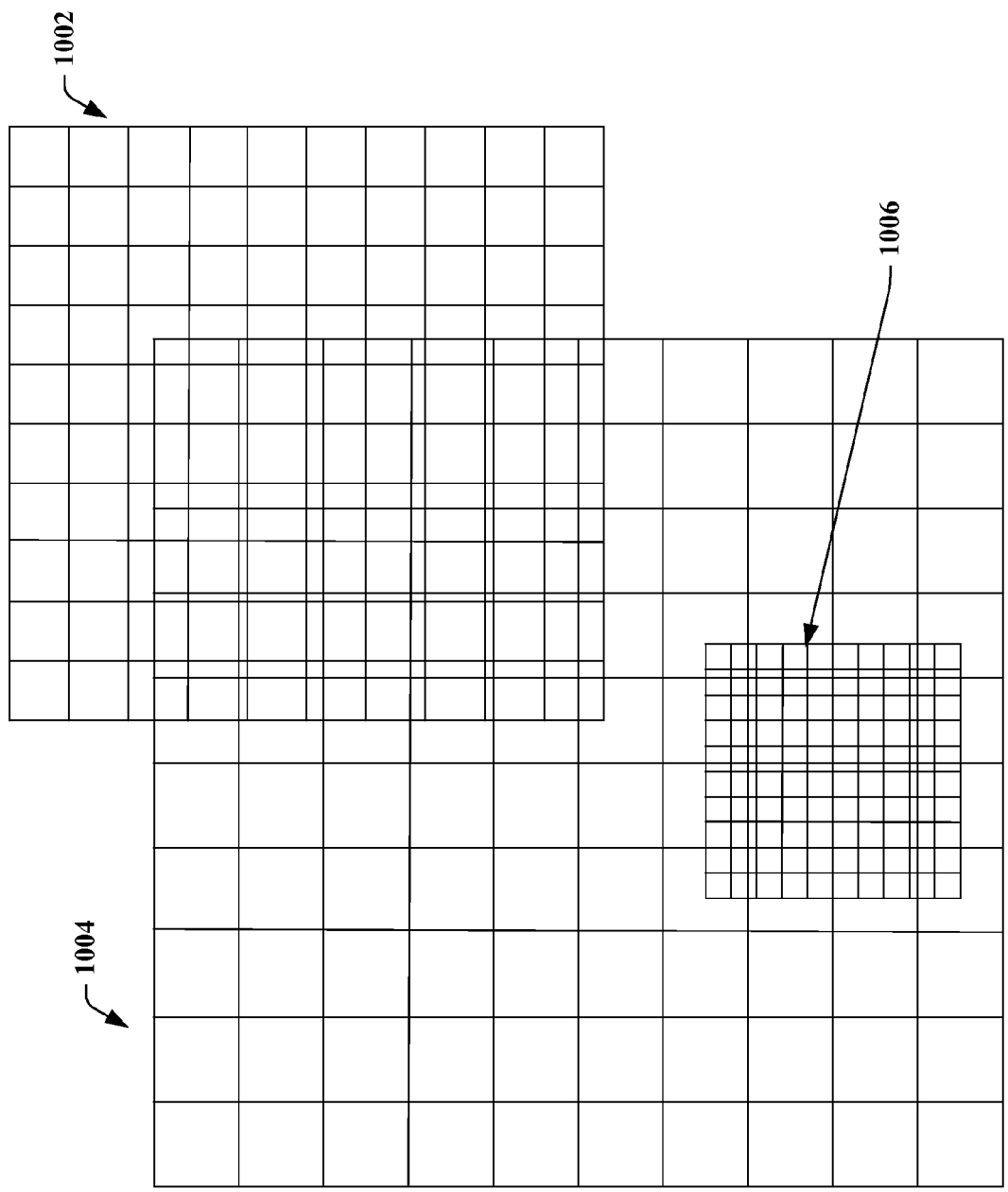
FIG. 10 illustrates an example of disparate grids with different domains and resolutions.

Referring now to FIG. 10, illustrated is an example of disparate grids with different domains and resolutions. As depicted, three grids (e.g., grid 1002, grid 1004, and grid 1006) are shown; however, any number, size, shape, etc. of grids can be employed. A procedure can be employed for expressing a set of arbitrary grids on a common grid to enable combining messages. Different messages can likely have different domains and resolutions associated with corresponding grids as shown in FIG. 10. Thus, a new grid domain and resolution can be defined to represent the combination of the input grids. According to an example, the new domain can be the bounding box of the input grids and the new resolution can be a high resolution or the resolution of the maximum resolution input. Further, each input grid can be converted to the new domain and resolution and then combined utilizing an appropriate technique as described below. Additionally or alternatively, the new grid can be reduced in size and resolution to meet an N×N size limit while still maintaining maximum fidelity.

A variable node can compute messages to be sent to its attached observation nodes. For a given observation node as a target, the variable node can utilize the messages sent from disparate attached observation nodes, excluding the observation node that is the target of the message. Each such received message can provide the confidence of the sending variable in its own location over a patch of ground, represented as a grid as described above. Higher values in the grid represent a high confidence that the variable is there, while lower values represent less confidence. Thus, the message from a base station variable represents a distribution of possible locations of the base station with confidences attached to each possible location. Likewise, the message from a detection variable represents the distribution of possible locations of the mobile radio receiver. The incoming messages can be combined in several different ways, including point-wise sum, product, minimum, and maximum.

An observation node computes messages to be sent to its attached variable nodes. Each such message represents the observation's idea of the receiving variable's location as a function of all other variables associated with the observation node, e.g., excluding the receiving variable. As an example, a message can be passed from a detection observation to an attached detection variable. The message can include the computed location of the detection variable given the messages from the detection observation's attached base station variables. This can be computed with a conventional triangulation formula, which produces a distribution of possible locations given the location distributions in the input messages.

To complete the database update, the locations of the base station variables can be estimated by combing all the incoming messages to each base station variable, using the same point-wise operation as used to compute outgoing messages.

Referring again to FIG. 7, the illustrated example can mitigate a number of edges associated with belief propagation. Each invocation of a location operation (e.g., "Locate Me") can produce a list of detected APs and, implicitly, a list of non-detected APs as shown. The non-detection observation can connect to every non-detected AP; however, this can break an assumption about observations and variables acting locally. Thus, belief propagation can be run first without using the non-detection observations until it converges. After convergence, the non-detection observations can be inserted by connecting them to APs variables that are within some maximum distance from the associated detection variable. Thereafter, belief propagation can be re-run with the added observations.

It is to be appreciated that access points can appear, disappear, and move. The probabilistic model can employ specific machinery for representing and manipulating confidences, usage, and such decisions as to whether to use versus overlook data points, based in part on a consideration of the age and/or stability of a data point over time. Also, multiple signs of malicious activity, designed to disrupt the predictions or signs of poor reliability and errors may be addressed with special methods.

As an example, the probabilistic model utilized in connection with the claimed subject matter can enable the network to settle quickly in response to such changes. For instance, if an AP is detected at a large distance from its former location, the AP can snap to its new location rather than waiting for new evidence to accumulate enough to outweigh the old evidence. However, it may be that odd detections like this can be due to mistakes in the data or malicious users; thus, the desire for quick snapping can be modulated with a model that damps arbitrary AP moves.

Figure 11:
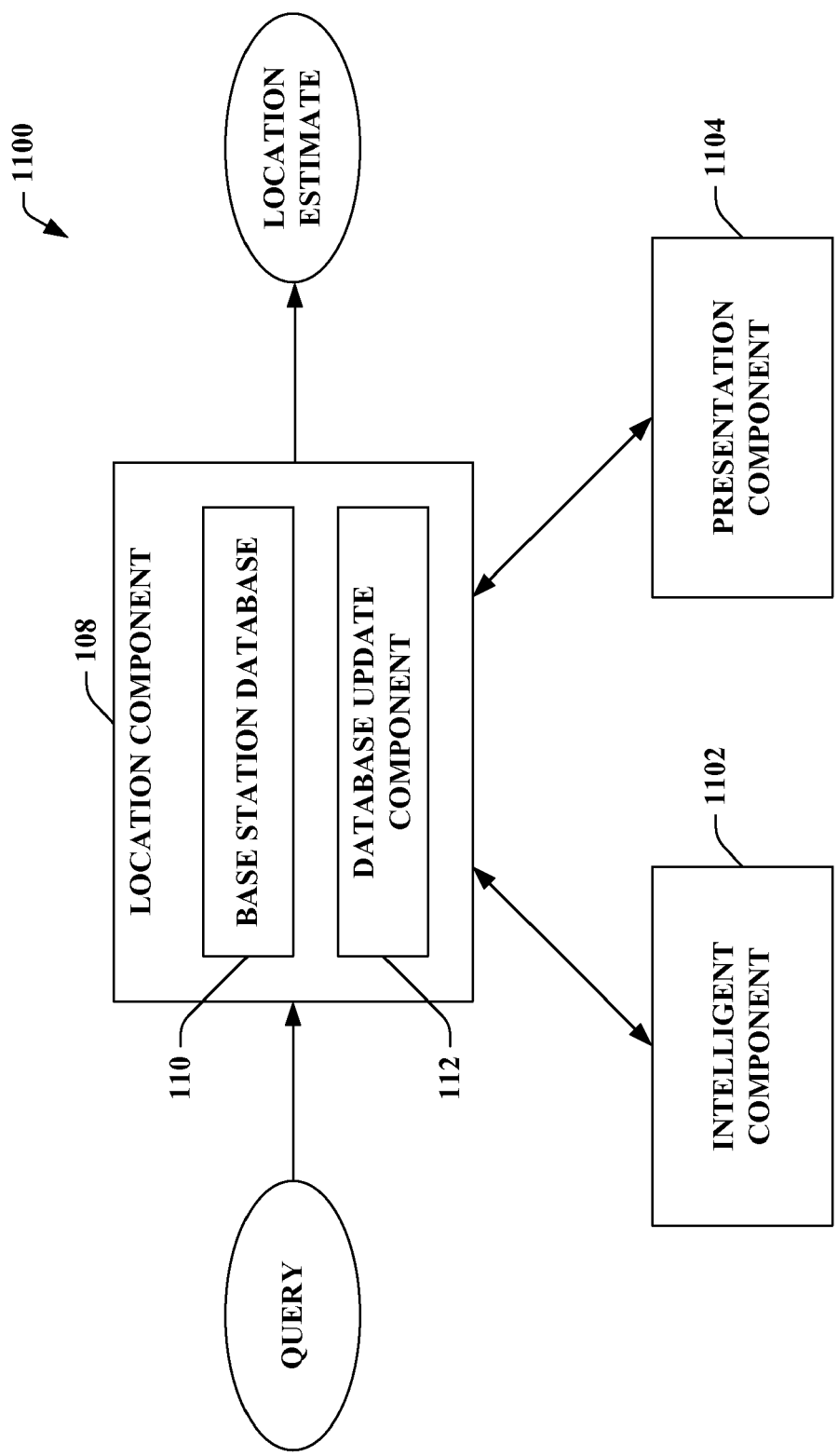
FIG. 11 illustrates a block diagram of an exemplary system that facilitates maintaining a database of base station related data.

Turning to FIG. 11, illustrated is a system 1100 that facilitates maintaining a database of base station related data. The system 1100 can include the location component 108, the base station database 110, and the database update component 112, each of which can be substantially similar to respective components described above. The system 1100 can further include an intelligent component 1102. The intelligent component 1102 can be utilized by the location component 108 to facilitate determining a location estimation corresponding to a mobile radio based upon the obtained query. Pursuant to another illustration, the intelligent component 1102 can enable determining whether errors exist within the base station database 110. For instance, the base station database 110 can include mistaken base station locations; thus, the intelligent component 1102 can identify the mistaken locations and/or facilitate correcting the base station database 110 by employing the database update component 112.

It is to be understood that the intelligent component 1102 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 1104 can provide various types of user interfaces to facilitate interaction between a user and any component coupled to the location component 108. As depicted, the presentation component 1104 is a separate entity that can be utilized with the location component 108. However, it is to be appreciated that the presentation component 1104 and/or similar view components can be incorporated into the location component 108 (and/or the mobile radio 102 of FIG. 1) and/or a stand-alone unit. The presentation component 1104 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the location component 108.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 12:
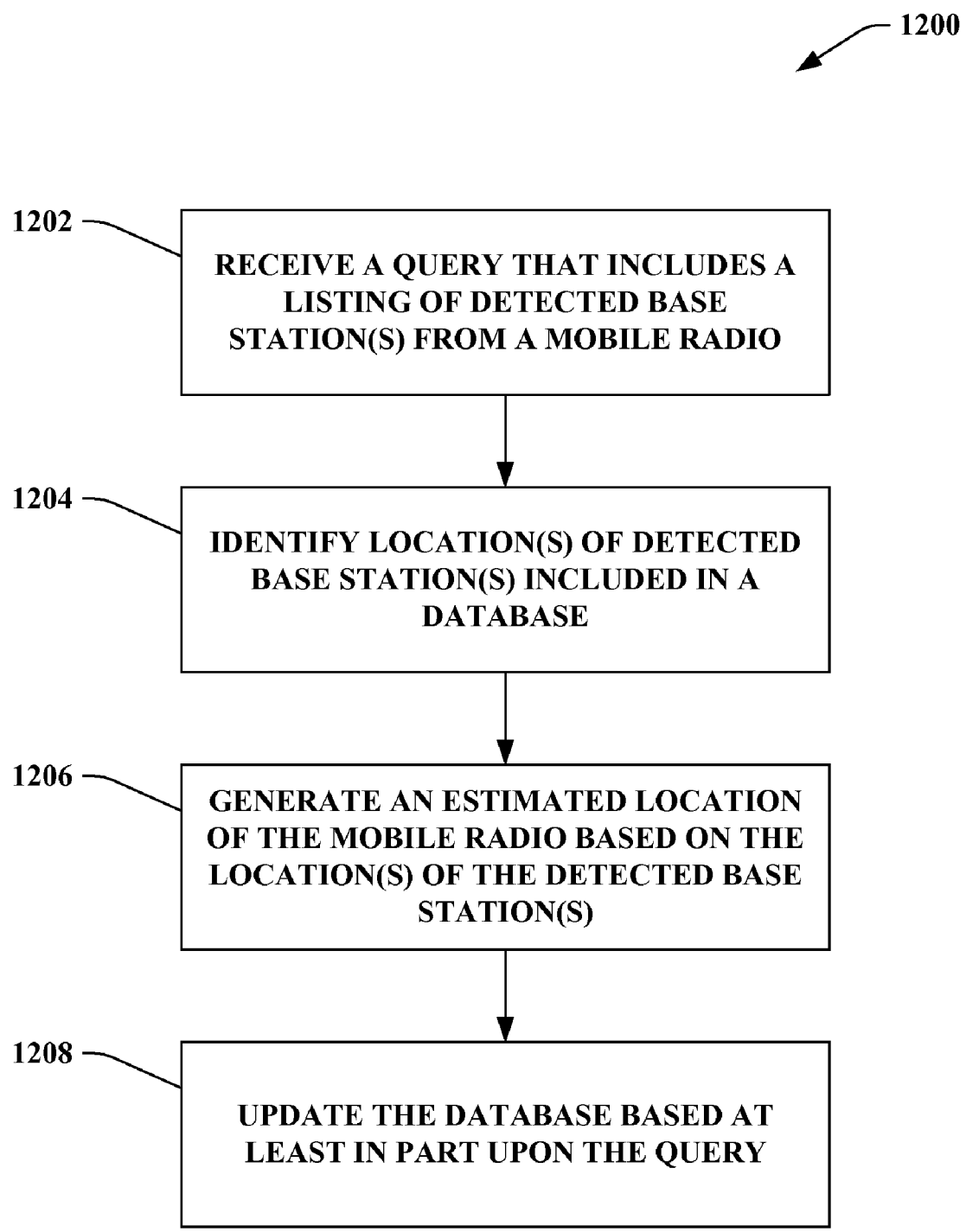
FIG. 12 illustrates an exemplary methodology that facilitates maintaining a database of base station related information.
Figure 13:
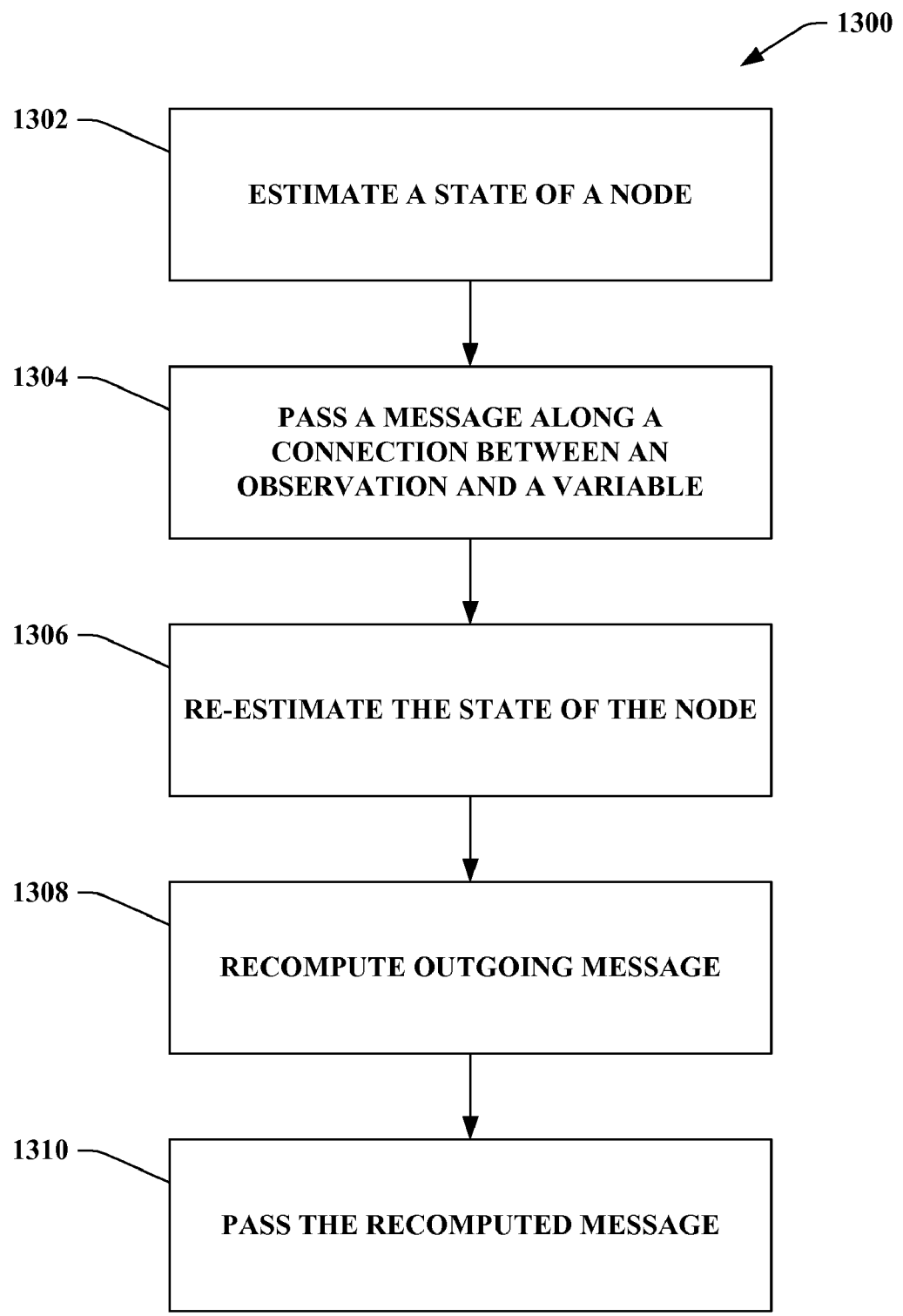
FIG. 13 illustrates an exemplary methodology that analyzes accumulated queries utilizing a message passing algorithm to estimate a location of unknown base station(s).

FIGS. 12-13 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 12, illustrated is a methodology 1200 that facilitates maintaining a database of base station related information. At 1202, a query that includes a listing of detected base station(s) can be received from a mobile radio. For instance, the detected base station(s) can be within a vicinity of the mobile radio. Further, the query can include information related to strength(s) of signal(s) corresponding to the detected base station(s). At 1204, location(s) of the detected base station(s) included in a database can be identified. By way of illustration, locations can be determined for known base stations included in the base station database. Additionally, an analysis of the detected base station(s) and the database can indicate an inclusion of unknown base station(s) within the listing associated with the query.

At 1206, an estimated location of the mobile radio can be generated based on the location(s) of the detected base station (s). Pursuant to an example, a triangulation technique that considers the location(s) of the base station(s) can be utilized to yield the estimation. Additionally, the estimated location can be provided to the mobile radio and/or the query can be stored. At 1208, the database can be updated based at least in part upon the query. The database can be modified to add, remove, and/or alter data associated with one or more of the base stations. For example, an unknown base station included in the query can be added to the database; in accordance with the aforementioned example, a position associated with the unknown base station can be the estimated location of the mobile radio as determined. Pursuant to another illustration, message passing can be utilized to estimate a location of a previously unknown base station.

Referring now to FIG. 13, illustrated is a methodology 1300 that analyzes accumulated queries utilizing a message passing algorithm to estimate a location of unknown base station(s). At 1302, a state of a node can be estimated. For example, the node can be a variable or an observation. The state of a variable node can be a corresponding location (e.g., represented as a two dimensional grid, . . . ). At 1304, a message can be passed along a connection between an observation and a variable. Any ordered pairing including an observation and a variable can be employed, where either the observation or the variable can be a source node. At 1306, the state of the node can be re-estimated. For instance, the state of a destination node can be reevaluated based upon an estimation provided by a source node. At 1308, an outgoing message can be recomputed. At 1310, the recomputed message can be passed (e.g., between ordered pairings). By way of illustration, a predetermined number of iterations of message passing can be utilized. Additionally or alternatively, the message passing can be terminated after the states converge.

Figure 14:
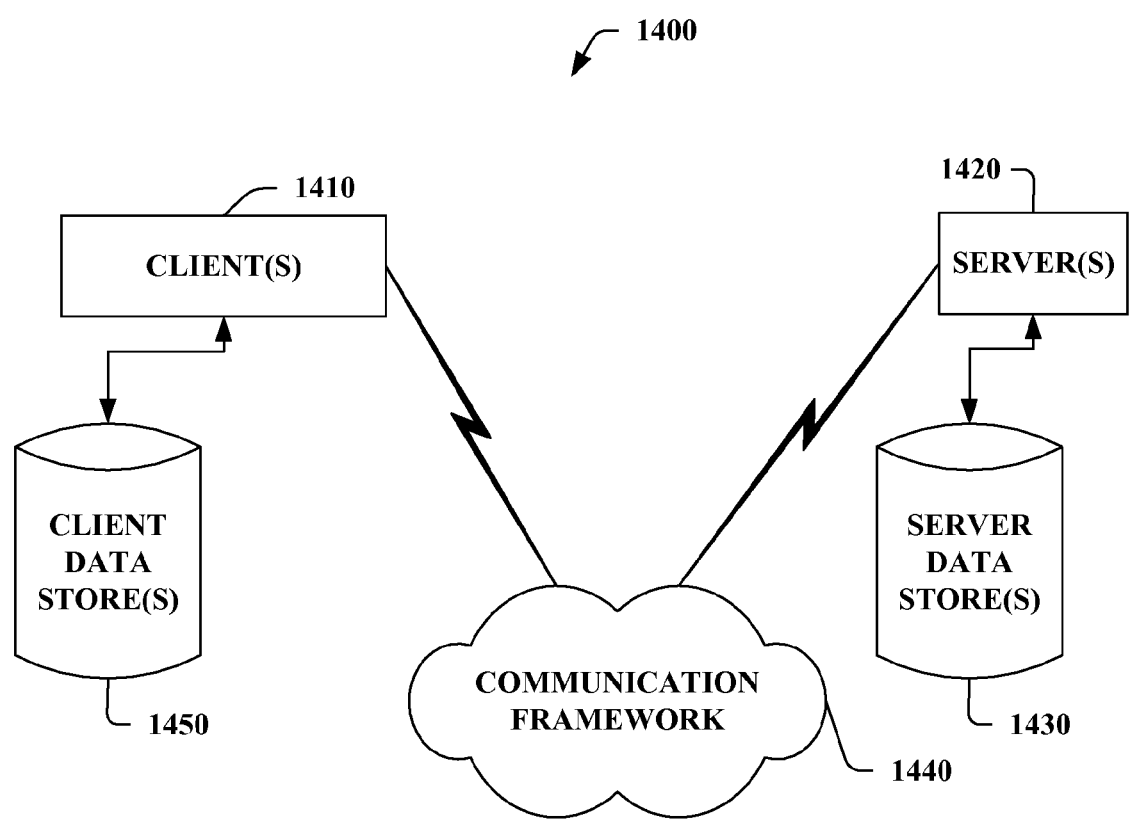
FIG. 14 illustrates an exemplary networking environment, wherein the novel aspects of the claimed subject matter can be employed.
Figure 15:
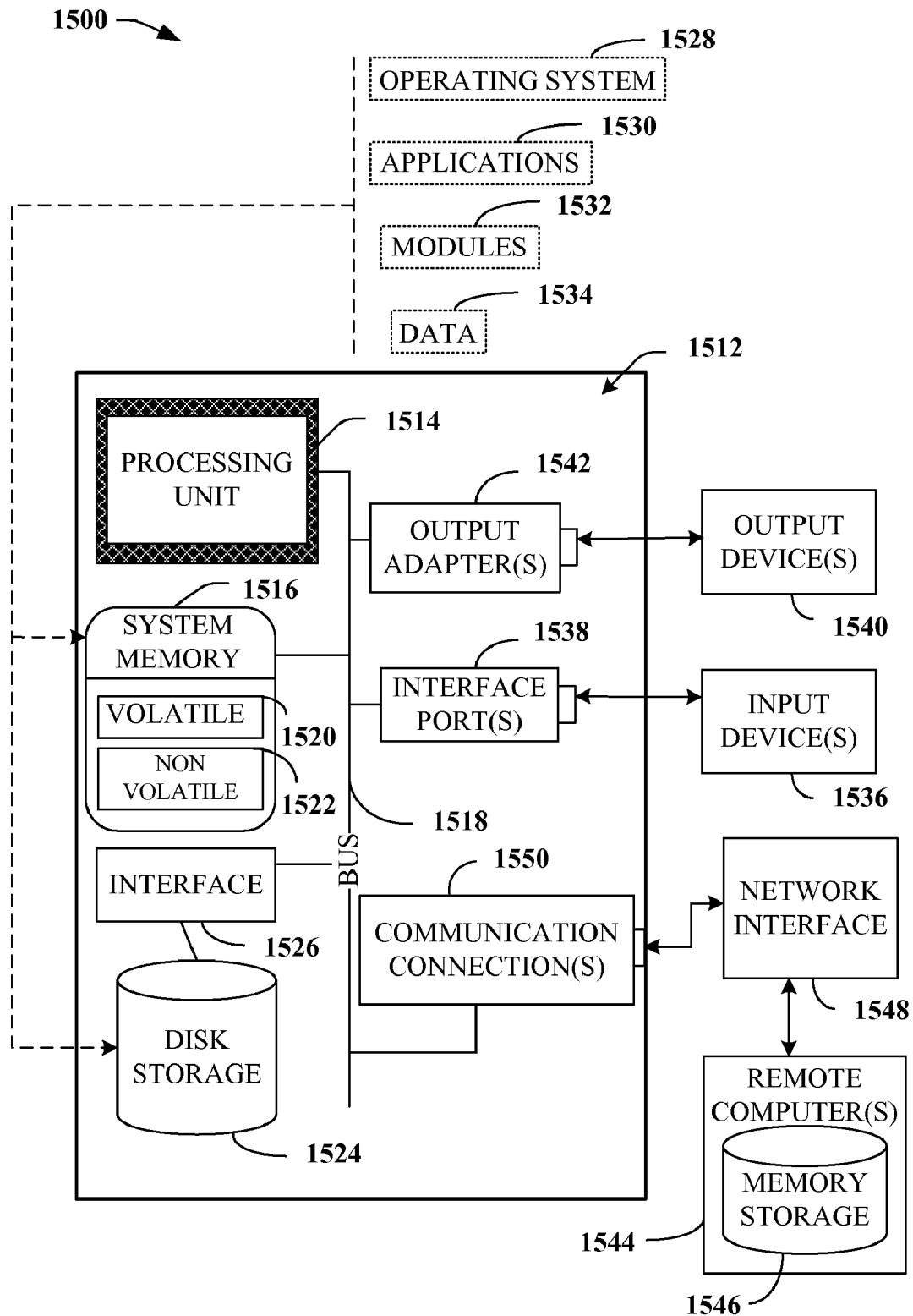
FIG. 15 illustrates an exemplary operating environment that can be employed in accordance with the claimed subject matter.

In order to provide additional context for implementing various aspects of the claimed subject matter, FIGS. 14-15 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices). The servers 1420 can house threads to perform transformations by employing the subject innovation, for example.

One possible communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the servers 1420.

With reference to FIG. 15, an exemplary environment 1500 for implementing various aspects of the claimed subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the claimed subject matter can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates automatically maintaining a base station database, comprising:
    a processor;
    a location component configured to be operated by the processor that receives a query that includes a listing of detected base stations from a mobile radio;
    a query store that retains the query in a log of queries received from mobile radio(s); and
    a database update component configured to be operated by the processor that updates the base station database to include an entry for one of the detected base stations listed in the query that was identified as not being included in the base station database, the updating including determining position-related data for the entry by utilizing message passing on data included in the log of queries, the determining further including constructing a graph of nodes corresponding to locations to be determined and locations of detected based stations contained in the log of queries and by performing message passing between the nodes in the graph.

2. The system of claim 1, wherein the location component being implemented upon a central server that communicates with at least one mobile radio or other mobile sensor.

3. The system of claim 1, wherein the database update component adds and/or removes data related to one or more of the detected base stations from the base station database.

4. The system of claim 1, wherein the database update component utilizes a message passing algorithm to analyze accumulated queries.

5. The system of claim 4, wherein the database update component employs variables representing a state of the system and observations representing measurements.

6. The system of claim 1, further comprising the mobile radio that detects the base stations and provides the query to the location component.

7. The system of claim 1, wherein the base station database includes latitude and longitude information related to known base stations.

8. The system of claim 1, wherein the detected base stations include at least one of a Wi-Fi access point, a cellular tower, and an FM radio station.

9. A method that facilitates maintaining a database of base station related information, comprising:
receiving a query that includes a listing of detected base stations from a mobile radio;
storing the query in a log of queries received from mobile radio(s);
updating the database to include an entry for one of the detected base stations listed in the query that was identified as not being included in the base station database, the updating including determining position-related data for the entry by utilizing message passing on data included in the log of queries, the determining further including constructing a graph of nodes corresponding to locations to be determined and locations of detected based stations contained in the log of queries and by performing message passing between the nodes in the graph.

10. The method of claim 9, wherein message passing further comprises:
estimating a state of one of the nodes;
passing an outgoing message along a connection between one of the nodes representing an observation and another of the nodes representing a variable, the variable corresponding to a location to be determined and the observation corresponding to a location of a detected base station;
re-estimating the state of the node having the estimated state;
recomputing the outgoing message; and
passing the recomputed message along the connection.

11. The method of claim 10, further comprising continuing to pass the message for a predetermined number of iterations.

12. The method of claim 10, further comprising terminating message passing after the state converges.

13. The method of claim 9, wherein the plurality of nodes include at least one node representing an observation and another node representing a variable, the variable corresponding to a location to be determined and the observation corresponding to a location of a detected base station.

14. The method of claim 13, wherein the state of the variable node is a corresponding location represented as a two dimensional grid.

15. A system that passively updates a database, comprising:
a processor;
means operable by the processor for receiving a query that includes a listing of detected base stations from a mobile radio;
means operable by the processor for storing the query in a log of queries received from mobile radio(s); and
means operable by the processor for updating the database to include an entry for one of the detected base stations listed in the query that was identified as not being included in the base station database, the updating including determining position-related data for the entry by utilizing message passing on data included in the log of queries, the determining further including constructing a graph of nodes corresponding to locations to be determined and locations of detected based stations contained in the log of queries and by performing message passing between the nodes in the graph.

16. The system of claim 15, wherein the location component is configured to generate the estimated location by utilizing a triangulation technique.

17. The system of claim 1, wherein the location component is further configured to generate an estimated location for the mobile radio responsive to the query, the estimated location being generated based on identified locations related to one or more of the detected base stations included in the base station database.

18. The system of claim 1, wherein the position-related data is determined based at least in part on the estimated location for the mobile radio.

19. The method of claim 9, further comprising:
identifying locations of the detected base stations determined to be included in the database of base station related information; and
generating an estimated location of the mobile radio based on the identified locations included in the database.

* * * * *